United States Patent
Giesy et al.

[11] Patent Number: 5,921,167
[45] Date of Patent: Jul. 13, 1999

[54] HERMETIC SHEAR SEAL FOR PISTON DISPLACEMENT FUEL TANK

[75] Inventors: Phillip J. Giesy, Kirkland; Charles J. Henniger, DesMoines; Jeffrey C. Maybee, Issaquah, all of Wash.

[73] Assignee: Primex Aerospace Company, Redmond, Wash.

[21] Appl. No.: 08/918,461

[22] Filed: Aug. 26, 1997

[51] Int. Cl.[6] .................. F16J 1/00; B67D 5/42; B65D 88/54; F02K 9/00
[52] U.S. Cl. .................. 92/172; 222/386; 222/689; 222/327; 60/259; 92/169.1; 92/165 R
[58] Field of Search .................. 222/153.06, 326, 222/327, 386, 389; 92/169.1, 172, 192, 165 R; 60/259, 39.48; 277/DIG. 10

[56] References Cited

U.S. PATENT DOCUMENTS

| | | |
|---|---|---|
| 3,545,343 | 12/1970 | Orbeck . |
| 3,986,630 | 10/1976 | Catlin et al. . |
| 4,561,568 | 12/1985 | Hoffmeister et al. .................. 222/130 |
| 4,972,969 | 11/1990 | Randklev .................. 222/1 |
| 5,042,365 | 8/1991 | Rosman . |
| 5,224,343 | 7/1993 | Steenborg et al. . |
| 5,263,329 | 11/1993 | Grove et al. . |
| 5,385,081 | 1/1995 | Sneddon .................. 92/192 |
| 5,598,762 | 2/1997 | Sneddon . |
| 5,613,299 | 3/1997 | Ring et al. . |

*Primary Examiner*—Andres Kashnikow
*Assistant Examiner*—Keats Quinalty
*Attorney, Agent, or Firm*—Gregory S. Rosenblatt; Wiggin & Dana

[57] ABSTRACT

In space exploration, an attitude control engine or a thruster may have an extended period, such as years, of inactivity prior to being required to complete a desired mission. The fuel for this mission is contained in a fuel tank for the same extended period of time and tends to corrode elastomeric components. To isolate the fuel from elastomeric components during the storage period, the fuel tank has a metallic shear seal. When actuated, a piston ruptures the shear seal and delivers the fuel to a power plant. A shear seal that is unitary with the inner walls of the fuel tank eliminates the need for an interfacial weld that may constitute a shear seal failure site.

20 Claims, 3 Drawing Sheets

HERMETIC SHEAR SEAL FOR PISTON DISPLACEMENT FUEL TANK

STATEMENT AS TO RIGHTS TO INVENTION

The U.S. Government has a paid up license in this invention and the right in limited circumstances to require the patent owner to license others on reasonable terms as provided for by the terms of Contract No. DASG60-92-C-0101 awarded by the United States Army.

BACKGROUND OF THE INVENTION

1. Field of the Invention

This invention relates to a fuel tank that is intended to remain in a filled condition for a long period of time. More particularly, a metallic seal that is unitary with the walls of the fuel tank isolates a fluid fuel from elastomeric components that may deteriorate from extended contact with the fuel.

2. Description of Related Art

Spacecraft power plants, such as attitude control engines and thrusters, that are used in extended time missions, for example interplanetary or extraplanetary exploration, frequently remain inactive for an extended time, such as years. At the end of this period of inactivity, a fuel is delivered to the power plant and that component performs its mission.

Contact with typical spacecraft fuels, such as monomethylhydrazine, cause the elastomeric components to corrode, or otherwise deteriorate, over time. Accordingly, the fuel is contained in a fuel tank that isolates the fuel from the elastomeric components during storage. Fuel is then delivered to the power plant at an appropriate time. In one method of delivery, a piston generates a pressure effective to deliver the fuel. Elastomeric components of the piston, such as pressure retaining 0-rings, are also subject to corrosion by contact with the fuel.

One approach to isolate the fuel from elastomeric components is to weld a thin metallic sheet to the inner wall of the fuel tank between the piston and the liquid fuel as an isolation seal. Actuation of the piston ruptures the isolation seal enabling the piston to deliver fuel to the power plant. The elastomeric components are exposed to fuel only during the power plant mission life, typically a few minutes or a few hours. Relatively short term exposure to the fuel reduces corrosion of elastomeric components to acceptable levels.

A welded isolation seal is disclosed in U.S. Pat. No. 5,385,081 to Sneddon that is incorporated by reference in its entirety herein.

It has proven difficult to reliably weld to an inside wall of a fuel tank and pinhole leaks in the weld enable the fuel to contact elastomeric components endangering reliable operation of the power plant. The weld integrity may impact the reliability of the isolation seal making it difficult to predict the force required for the piston to rupture the seal. Welding also increases processing costs and reduces the robustness of the fuel tank. While it is possible to evaluate the integrity of the weld by x-ray analysis, this analysis is time-consuming and expensive.

Accordingly, there remains a need for a fuel tank that isolates fuel from the elastomeric components that does not have the disadvantages of a welded isolation seal.

SUMMARY OF THE INVENTION

Accordingly, it is an object of the invention to provide a fuel tank for a spacecraft that is capable of storing fuel for an extended period of time without deterioration of elastomeric components. It is a feature of the invention that the fuel tank contains a shear seal unitary with the inner walls of the fuel tank. By unitary, it is meant that the shear seal is machined, or otherwise formed, from the same body of material as the walls of the fuel tank.

Among the advantages of the invention are that the shear seal is unitary with the walls of the fuel tank eliminating a discontinuous interface such as a weld, adhesive bond, or other joint. The absence of a discontinuous interface increases both the reliability and robustness of the shear seal.

In accordance with the invention, there is provided a tank for containing a fuel. The tank has a body formed from a machinable material with peripheral sidewalls that circumscribe a fluid containment chamber. An end plate is attached to a first section of the peripheral sidewalls and spans the fluid containment chamber. A shear seal that is unitary with a second section of the peripheral sidewalls also spans the fluid containment chamber. The shear seal has a centrally disposed membrane spanning portion and an attach portion. The attach portion is disposed between the membrane spanning portion and the peripheral sidewalls. Further, the thickness of the attach portion is less than the thickness of the membrane spanning portion.

The above-stated objects, features and advantages will become more apparent in the specification and drawings that follow.

IN THE DRAWINGS

DETAILED DESCRIPTION

Figure 1:
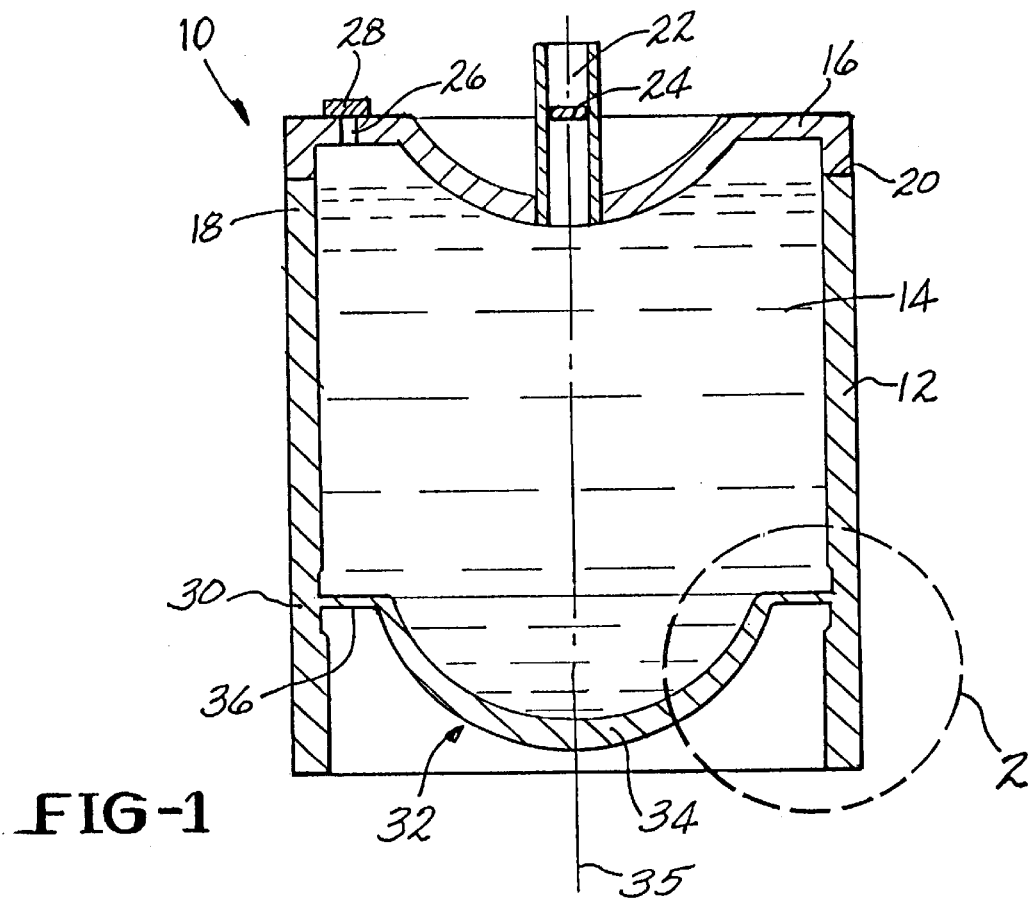
FIG. 1 illustrates in cross-sectional representation a fuel tank having a unitary shear seal in accordance with the invention.

FIG. 1 illustrates a fuel tank 10 in accordance with the invention. The fuel tank 10 has peripheral sidewalls 12 circumscribing a fluid containment chamber 14 containing a fluid fuel, either a liquid such as monomethylhydrazine or a gas such as hydrogen.

An end plate 16 is attached 20 to a first section 18 of the peripheral sidewalls 12 such as by welding, brazing or other suitable joining method. The end plate 16 contains an outlet conduit 22 that delivers the fuel to a power plant (not shown). A burst disk 24, such as a sheet of aluminum foil, prevents the fuel from exiting the outlet conduit 22 prematurely. An inlet conduit 26 is used to fill the fluid containment chamber 14 with fuel prior to launch. A fuel tank cap 28 then hermetically contains the fuel within the fluid containment chamber 14.

At a second section 30 of the fuel tank 10, is shear seal 32. The shear seal 32 spans the fluid containment chamber 14 such that the combination of the peripheral sidewalls 12, end plate 16 and shear seal 32 forms a hermetic fluid containment chamber 14.

The shear seal 32 has a centrally disposed membrane portion 34 that is generally symmetrically aligned about a longitudinal axis 35 of the fuel tank 10. Disposed between the centrally disposed membrane spanning portion 34 and the peripheral sidewalls 12 is an attach portion 36.

The peripheral sidewalls 12 and the attach portion 36 are unitary, machined from the same body of material without an interfacial weld, braze or other joint. Preferably, the membrane spanning portion 34 is likewise unitary with both the peripheral sidewalls 12 and attach portion 36.

The machinable body used to fabricate the peripheral sidewalls 12 and shear seal 32 is any material that is substantially inert, not corroded or otherwise not degraded, by extended contact with a fuel. By extended contact, it is meant the anticipated time from the filling of the fuel tank until the mission life, be it six months, several years or tens of years.

For interplanetary and extraplanetary exploration where the containment time may be on the order of tens of years, the machinable body is preferably a metal such as aluminum, titanium or a nickel-iron alloy such as Inconel (nominal composition by weight of 58%–63% nickel, 21%–25% chromium and the balance iron). For weight considerations, aluminum, titanium and alloys thereof are more preferred. For a combination of low weight and ease of machinability, aluminum and aluminum alloys are most preferred. One suitable aluminum alloy is aluminum alloy 7075 having the nominal composition by weight of 1.2%–2% copper, 2.1%–2% copper, 2.1%–2.9% magnesium, 0.18%–0.28% chromium, 5.1%–6.1% zinc and the balance aluminum.

Figure 2:
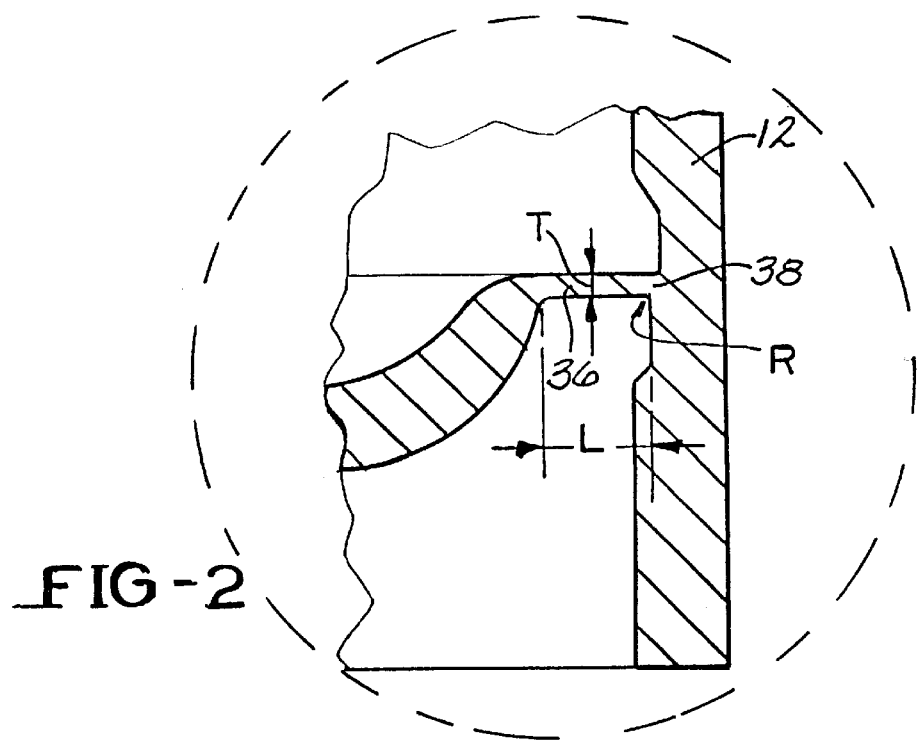
FIG. 2 illustrates in cross-sectional representation the interface of the shear seal and sidewalls of the fuel tank.

FIG. 2 is a magnified illustration of the portion of FIG. 1 indicated by a broken circle. FIG. 2 illustrates the unitary construction of the peripheral sidewalls 12 and the attach portion 36. When the fuel tank is actuated, the attach portion 36 separates from the peripheral sidewalls 12 at a fracture point 38 that is proximate to the sidewalls 12. The fracture point 38 should be less than 0.015 inch from the upstream sidewalls 12 and is preferable less than about 0.005 inch from the upstream sidewalls. Failure at the fracture point 38 is achieved by control of the shear radius (R), the shear thickness (T) and the shear length (L). These parameters are selected to form a robust shear seal requiring a force of at least 1000 pounds-force to rupture. More preferably, the force required to rupture the hermetic seal is on the order of 2000 pounds-force or greater. When formed from titanium, suitable values are:

R=0.005–0.010;

T=0.007 inch–0.011 inch; and

L=0.180 inch–0.200 inch.

When formed from aluminum alloy 7075, suitable values for the parameters are:

R: 0.005–0.030;

T: 0.025 inch–0.038 inch; and

L: 0.180 inch–0.200 inch.

To assist failure at fracture point 38, the spanning membrane 34 is significantly more thick than the attach portion 36. Typically, the spanning membrane 34 is at least twice as thick as the attach portion 36 and preferably, on the order of three to five times as thick. For example, when the thickness of the attach portion 36 is between 0.007 inch and 0.011 inch, the spanning membrane thickness is on the order of 0.030 inch to 0.035 inch.

In one method of manufacture, the fuel tank is formed from a solid body of a machinable material such as titanium or an aluminum alloy. While typically the machinable body will be a cylinder for ease of manufacture and symmetry, other shapes are equally amenable. The fuel containment chamber is then formed by a metal removal process such as CNC (computerized numerical control) machining. Shear seal 32 is likewise formed by the same metal removal process. When a machinable metal such as titanium or an aluminum alloy is employed, it has been found that machining tolerances on the order of ±0.0025 inch are possible and machining a fuel tank, of the type illustrated in FIG. 1, with a typical a diameter of about 3 inches is both economical and precise.

Figure 3:
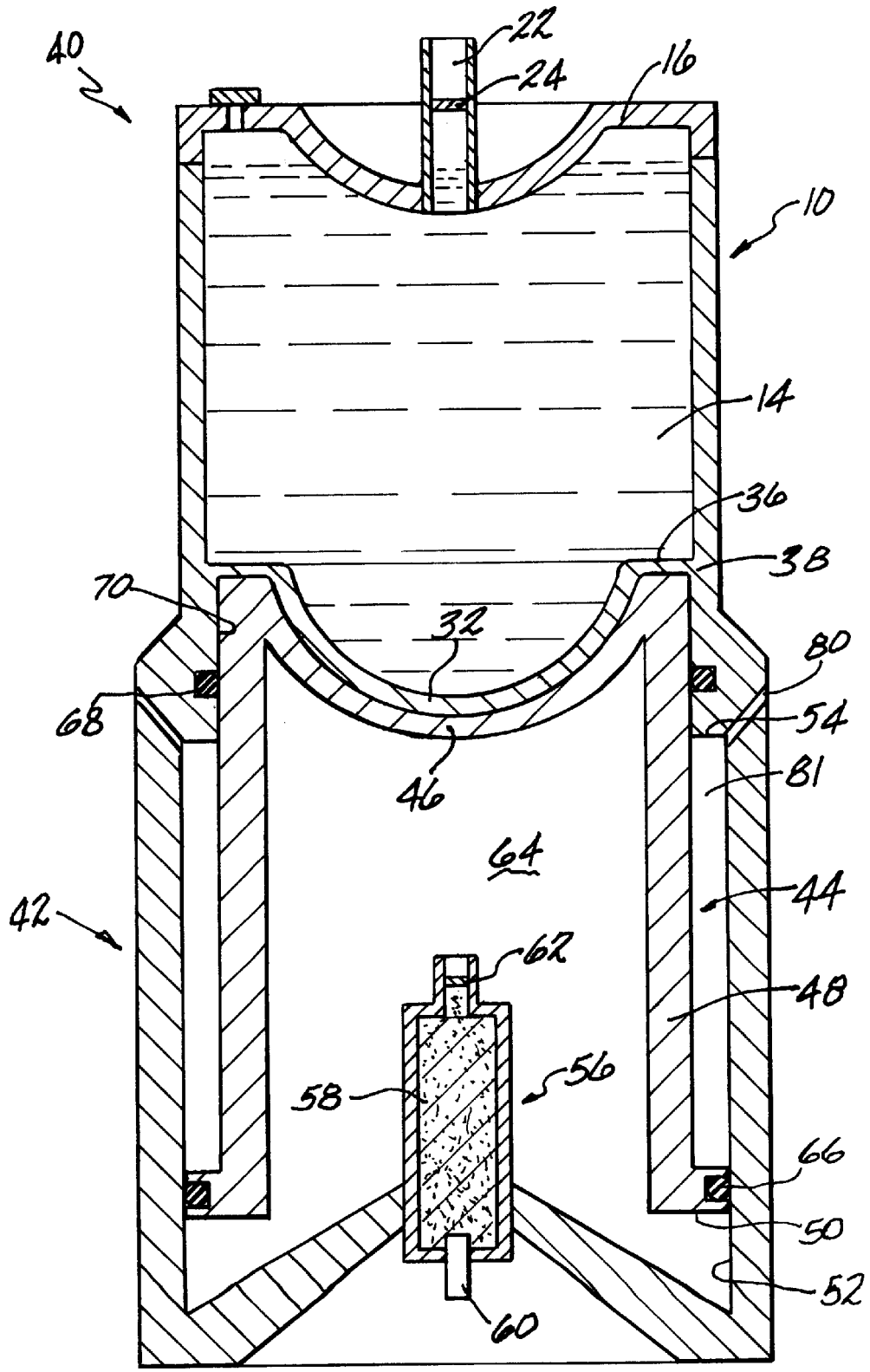
FIG. 3 illustrates in cross-sectional representation the fuel tank of the invention during a period of inactivity.
Figure 4:
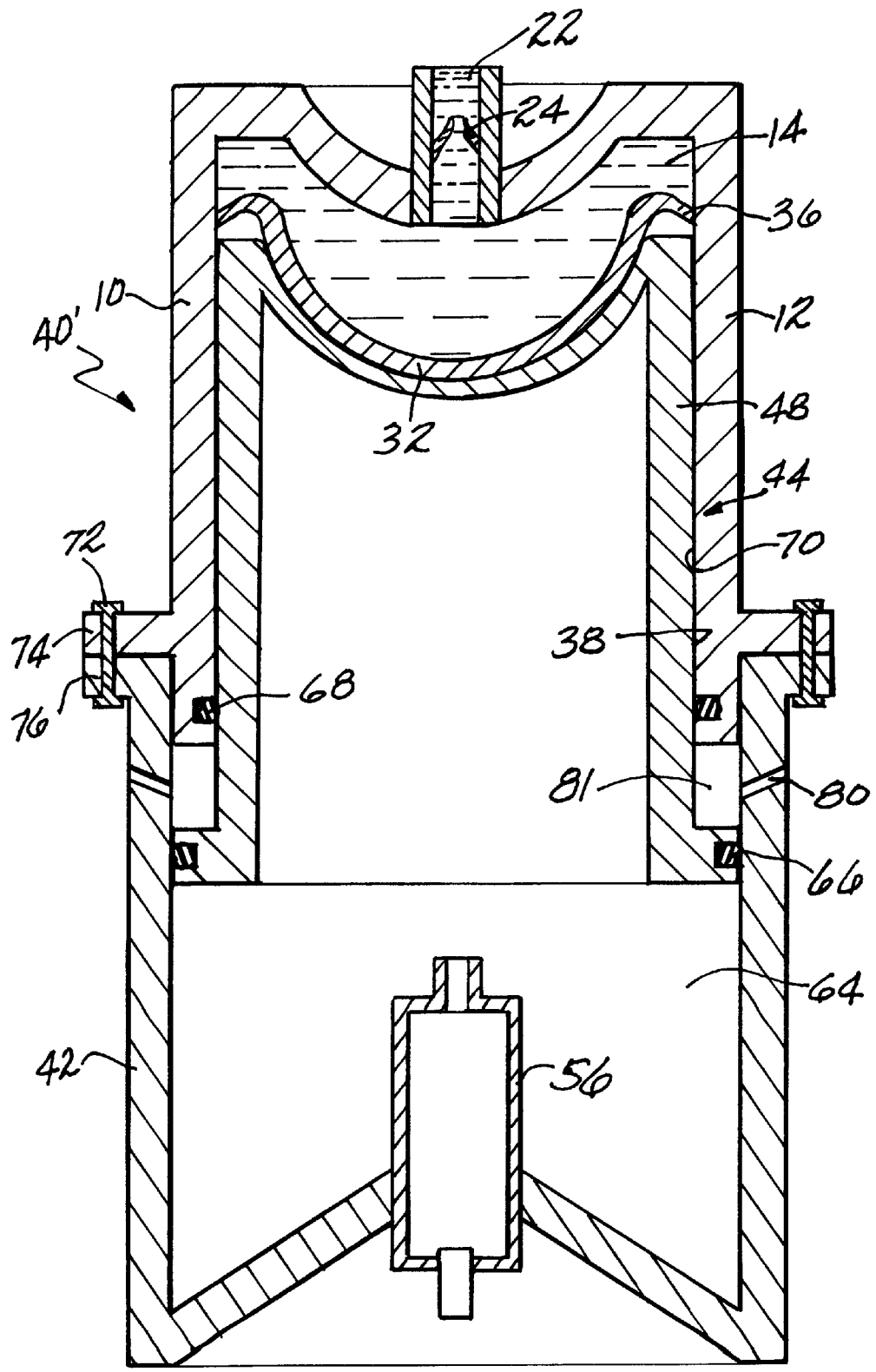
FIG. 4 illustrates in cross-sectional representation the fuel tank of the invention during its mission.

FIG. 3 illustrates in cross-sectional representation a fuel tank assembly 40 illustrating the fuel tank 10 described above during a period of inactivity, such as during interplanetary flight, prior to mission initiation. Mounted to the fuel tank 10 is a pressure generating portion 42. The pressure generating portion 42 may be unitary with the fuel tank 10, as illustrated in FIG. 3, or bonded to the fuel tank as illustrated in FIG. 4.

Referring back to FIG. 3, a piston 44 has a piston head 46 that substantially mates with the shear seal 32. Piston cylinder 48 extends from the piston head 46 into the pressure generating portion 42 and terminates at a radially extending flange 50 that terminates in close proximity to the inner walls 52 of the pressure providing portion. The length of the piston cylinder 48 is preferably selected such that at the end of a piston stroke, when the flange 50 contacts a stop 54, the shear seal 32 driven by the piston head 46 is in close proximity to the end plate 16, thereby maximizing removal of fuel from the fluid containment chamber 14. Vent holes 80 are disposed circumfrentially about the walls of the pressure generating portion 42 to prevent the accumulation of pressure in the annular void space 81 as the piston 44 moves within the tank assembly 40.

Actuation of the piston 44 is by any suitable means, such as hydraulics, a mechanical screw, or as illustrated in FIG. 3, a pressurized gas. A gas generator 56 contains a gas generating composition 58. The gas generating composition 58 is selected to be a chemical compound that generates copious volumes of gas when ignited. Suitable materials for the gas generating composition 58 include ammonium perchlorate based propellants. An electric squib 60 or other igniting means is coupled to a control panel, a computer or an internal microprocessor and is fired at the mission initiation point 60 to ignite the gas generating composition 58. As the volume of gas increases, a burst disk 62 is ruptured, releasing the gas into a gas containment chamber 64. As the pressure within the gas containment chamber 64 increases, the piston 44 applies an increasing force on the attach portion 36 leading to failure at fracture point 38. The piston 44 is then driven by gas pressure into the fluid containment chamber 14, causing the contained fuel to rupture the burst disk 24 expelling fuel through conduit 22.

To retain adequate tank pressure, both the fluid containment chamber 14 and the gas containment chamber 64 are hermetic. Hermeticity in the fluid containment chamber 14 is achieved by a first elastomeric gasket or 0-ring 68 disposed about an inner wall 70 of the fuel tank 10, contacting the cylinder 48 of the piston 44. Hermeticity in the gas containment chamber 64 is achieved by a second elastomeric gasket or O-ring 66 disposed about the flange 50 to contact the inner walls 52. To achieve hermeticity, the first 68 and second 66 gaskets are formed from an elastomeric material such as silicone rubber or ethylene propylene rubber. Since elastomeric material may be deteriorated by extended contact with the fuel, the shear seal 32 isolates the first gasket 68 from fuel contained within the fluid containment chamber until actuation of the fuel tank assembly 40.

In an alternative embodiment, illustrated in cross-sectional representation in FIG. 4, the fuel tank assembly 40' has a separate fuel tank 10 and pressure generating portion 42. The two components are integrally joined together with a fastening mechanism such as by rivets 72, bolts or a braze. To assist in forming an integral joint, the fuel tank 10 may be provided with a fuel tank flange 74 and the pressure generating portion 42 provided with a pressure generating portion flange 76. The fastening mechanism then extends through the flanges 74, 76 at a position remote from the piston 44 such that operation of the piston 44 is not impeded by the fastening mechanism.

In FIG. 4, the gas generator 56 has been actuated, causing the piston 44 to fracture the attach portion 36 of the shear seal 32 from the fracture point 38. Movement of the piston 44 pressurized the fuel contained within the fluid containment chamber 14 causing the burst disk 24 to rupture and fuel to flow from outlet conduit 22 to the power plant.

Constant pressure in the gas containment chamber 64 maintains a constantly pressurized source of fuel within the fluid containment chamber 14 available on demand to the power plant, either in a steady flow or intermittent use, so long as there is remaining free travel of the piston 44.

The fracture point 38 may not be a clean fracture and may form a burr or an extended piece of metal on the peripheral sidewalls 12 of the fuel tank 10. Neither gasket 66, 68 is required to pass over the fracture point. Passing an elastomeric material over a rough metallic surface puts the elastomeric material at risk of failure, either causing a loss of pressurizing gas or a loss of fuel. This problem is eliminated by the fuel tank assembly of the invention.

When the fuel from the fuel containment chamber 14 is essentially depleted, the first gasket 68 and second gasket 66 are in close proximity. The second gasket 66 has a tendency to pivot the piston cylinder 48. Having the shear seal fracture at the fracture point results in the attach portion 36 traveling along the inside surfaces 70 of the peripheral sidewalls 12. The attach portion 36 resists offsetting of the piston cylinder 48 due to pivoting about the first gasket 68 and prevents jamming of the piston 44.

While the invention has been described in terms of a fuel tank assembly for spacecraft applications, it is equally suitable for other applications requiring extended storage of a fluid. For example, a fire suppression system integrated into a structure or aircraft.

It is apparent that there has been provided in accordance with this invention a fuel tank capable of extended storage of a fuel that fully satisfies the objects, features and advantages set forth hereinabove. While the invention has been described in combination with specific embodiments thereof, it is evident that many alternatives, modifications and variations will be apparent to those skilled in the art in light of the foregoing description. Accordingly, it is intended to embrace all such alternatives, modifications and variations as fall within the spirit and broad scope of the appended claims.

We claim:

1. A tank for containing a fluid, comprising:
    a machinable body having peripheral sidewalls that circumscribe a fluid containment chamber;
    an end plate attached to a first section of said peripheral side walls and spanning said fluid containment chamber;
    a shear seal unitary with a second section of said peripheral sidewalls and spanning said fluid containment chamber, said shear seal having a centrally disposed membrane spanning portion and an attach portion, said attach portion being disposed between said membrane spanning portion and said peripheral sidewall, the thickness of said attach portion being less than the thickness of said membrane spanning portion.

2. The tank of claim 1 wherein said membrane spanning portion thickness is at least twice the thickness of said attach portion.

3. The tank of claim 2 wherein said membrane spanning portion is unitary with both said attach portion and said peripheral sidewalls.

4. The tank of claim 3 wherein said machinable body is metallic.

5. The tank of claim 4 wherein said machinable body is selected from the group consisting of Inconel, titanium, aluminum and alloys thereof.

6. The tank of claim 5 wherein said machinable body is titanium and said attach portion has a thickness of from about 0.007 inch to about 0.011 inch, said attach portion length is from about 0.180 inch to about 0.200 inch and the radius of curvature between said attach portion and said peripheral sidewalls is from about 0.005 to about 0.010.

7. The tank of claim 5 wherein said machinable body is an aluminum base alloy and said attach portion has a thickness of from about 0.025 inch to about 0.038 inch, said attach portion length is from about 0.180 inch to about 0.200 inch and the radius of curvature between said attach portion and said peripheral sidewalls is from about 0.025 to about 0.030.

8. The tank of claim 5 wherein said machinable body is an aluminum base alloy and said attach portion has a thickness of from about 0.025 inch to about 0.038 inch, said attach portion length is from about 0.180 inch to about 0.200 inch and the radius of curvature between said attach portion and said peripheral sidewalls is from about 0.005 to about 0.030.

9. A fluid tank assembly, comprising:
    a fluid tank having a machinable body with peripheral sidewalls that circumscribe a fluid containment chamber, an end plate attached to a first section of said peripheral side walls and spanning said fluid containment chamber, a shear seal unitary with a second section of said peripheral sidewalls and spanning said fluid containment chamber, said shear seal having a centrally disposed membrane spanning portion and an attach portion, said attach portion being disposed between said membrane spanning portion and said peripheral sidewall, the thickness of said attach portion being less than the thickness of said membrane spanning portion;
    a pressure generating portion integral with said fluid tank;
    a piston disposed within said pressure generating portion, said piston having a piston head in substantially mating alignment with said shear seal; and
    a piston actuator capable of generating a force effective to cause said piston head to rupture said attach portion.

10. The tank assembly of claim 9 wherein said piston actuator is selected from the group consisting of hydraulics, mechanical screws and gas generators.

11. The tank assembly of claim 10 wherein said piston actuator is a gas generator.

12. The tank assembly of claim 11 wherein said gas generator is charged with an ammonium perchlorate based propellant.

13. The tank assembly of claim 11 further including at least one elastomeric component disposed between said piston and an inner wall of said pressure generating portion.

14. The tank assembly of claim 11 wherein said elastomeric component is corroded by extended exposure to monomethylhydrazine.

15. The tank assembly of claim 14 wherein said elastomeric component is a gasket formed from a material selected from the group consisting of silicone rubber and ethylene propylene rubber.

16. The tank assembly of claim 13 wherein said membrane spanning portion is unitary with both said attach portion and said peripheral sidewalls.

17. The tank assembly of claim 16 wherein said machinable body is metallic.

18. The tank assembly of claim 17 wherein said machinable body is selected from the group consisting of Inconel, titanium, aluminum and alloys thereof.

19. The tank assembly of claim 18 wherein said fuel tank and said pressure generating portion are unitary.

20. The tank of claim 19 wherein said machinable body is titanium and said attach portion has a thickness of from about 0.007 inch to about 0.011 inch, said attach portion length is from about 0.180 inch to about 0.200 inch and the radius of curvature between said attach portion and said peripheral sidewalls is from about 0.005 to about 0.010.

* * * * *